Figure 3:
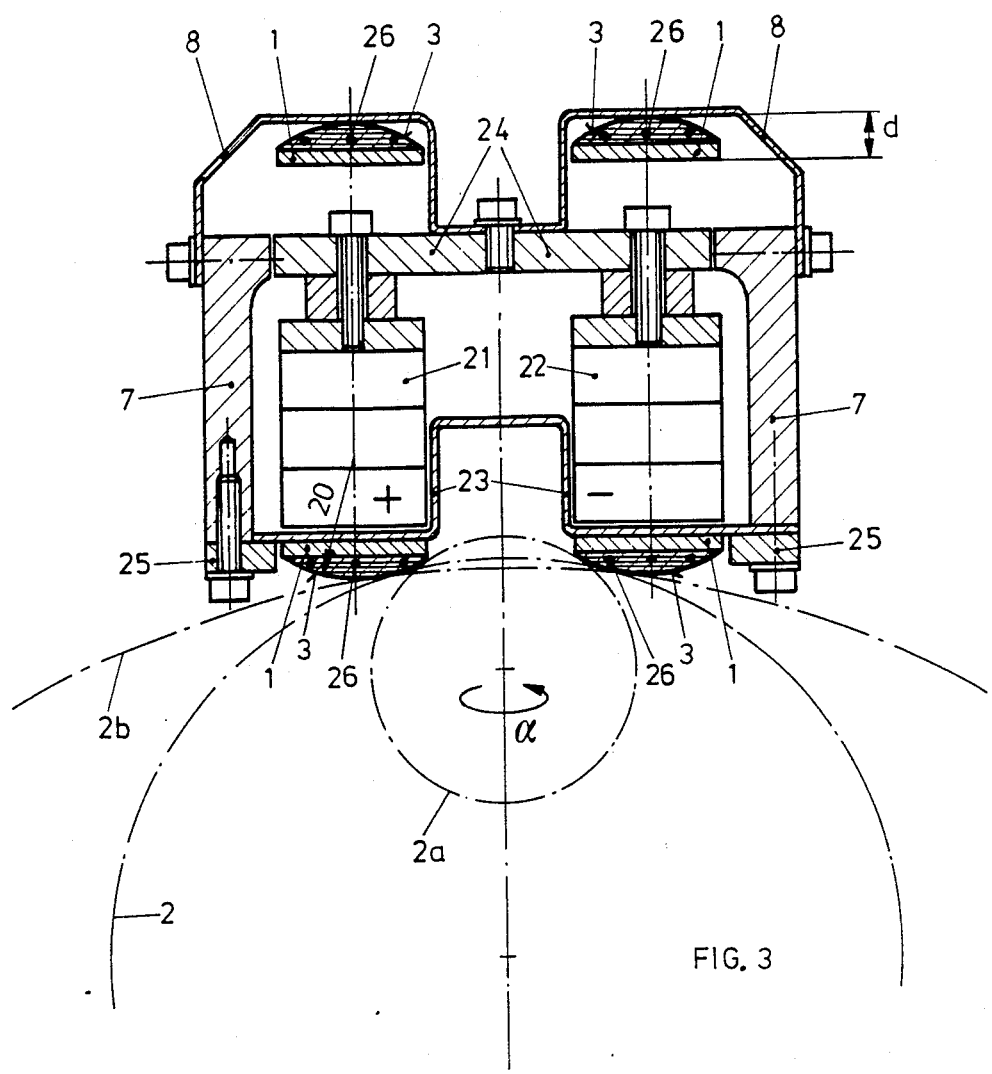

United States Patent [19]

Guntensperger

[11] Patent Number: 4,925,012
[45] Date of Patent: May 15, 1990

[54] DEVICE FOR THE POSITIONALLY ACCURATE TRANSPORT OF CONTAINERS

[75] Inventor: August Guntensperger, Ruti, Switzerland

[73] Assignee: Prazisions-Werkzeuge AG, Ruit, Switzerland

[21] Appl. No.: 191,369

[22] Filed: May 9, 1988

[30] Foreign Application Priority Data

May 11, 1987 [CH] Switzerland ............... 1783/87

[51] Int. Cl.⁵ ............................ B65G 15/58
[52] U.S. Cl. ................... 198/690.1; 198/817
[58] Field of Search ............ 198/817, 818, 690.1, 198/690.2, 699.1, 697

[56] References Cited

U.S. PATENT DOCUMENTS

| 1,781,750 | 11/1930 | Dodge et al. | 198/817 |
| 1,937,991 | 12/1933 | Stearns | 198/690.1 |
| 2,432,024 | 12/1947 | Lipton | 198/817 X |
| 2,731,137 | 1/1956 | Socke | 198/690.1 |
| 2,897,952 | 8/1959 | Buccicone | 198/690.1 X |
| 3,164,269 | 1/1965 | Roosevelt | 198/690.1 X |
| 3,165,196 | 1/1965 | Alfredeen | 198/690.1 |
| 3,356,205 | 12/1967 | McLeod | 198/817 X |
| 3,523,602 | 8/1970 | Mojden | |
| 3,581,873 | 6/1971 | Spodig | 198/690.1 |

FOREIGN PATENT DOCUMENTS

| 2219354 | 10/1973 | Fed. Rep. of Germany . | |
| 2243124 | 3/1974 | Fed. Rep. of Germany | 198/817 |
| 2311927 | 9/1974 | Fed. Rep. of Germany | 198/817 |
| 1046037 | 11/1951 | France . | |
| 2342918 | 9/1977 | France . | |
| 2118122 | 10/1983 | United Kingdom | 198/690.1 |

Primary Examiner—Robert J. Spar
Assistant Examiner—James R. Bidwell
Attorney, Agent, or Firm—Antonelli, Terry & Wands

[57] ABSTRACT

The present invention describes a device consisting of an endless flat conveyor belt arrangement for the positionally accurate transport of containers wherein the flat conveyor belt arrangement comprises two parallel convex load-bearing surfaces (3). In the conveyance of ferromagnetic containers, such as cans (2), for example, magnets (21, 22) are utilized which pull the cans (2) onto the conveyor belts (1).

14 Claims, 6 Drawing Sheets

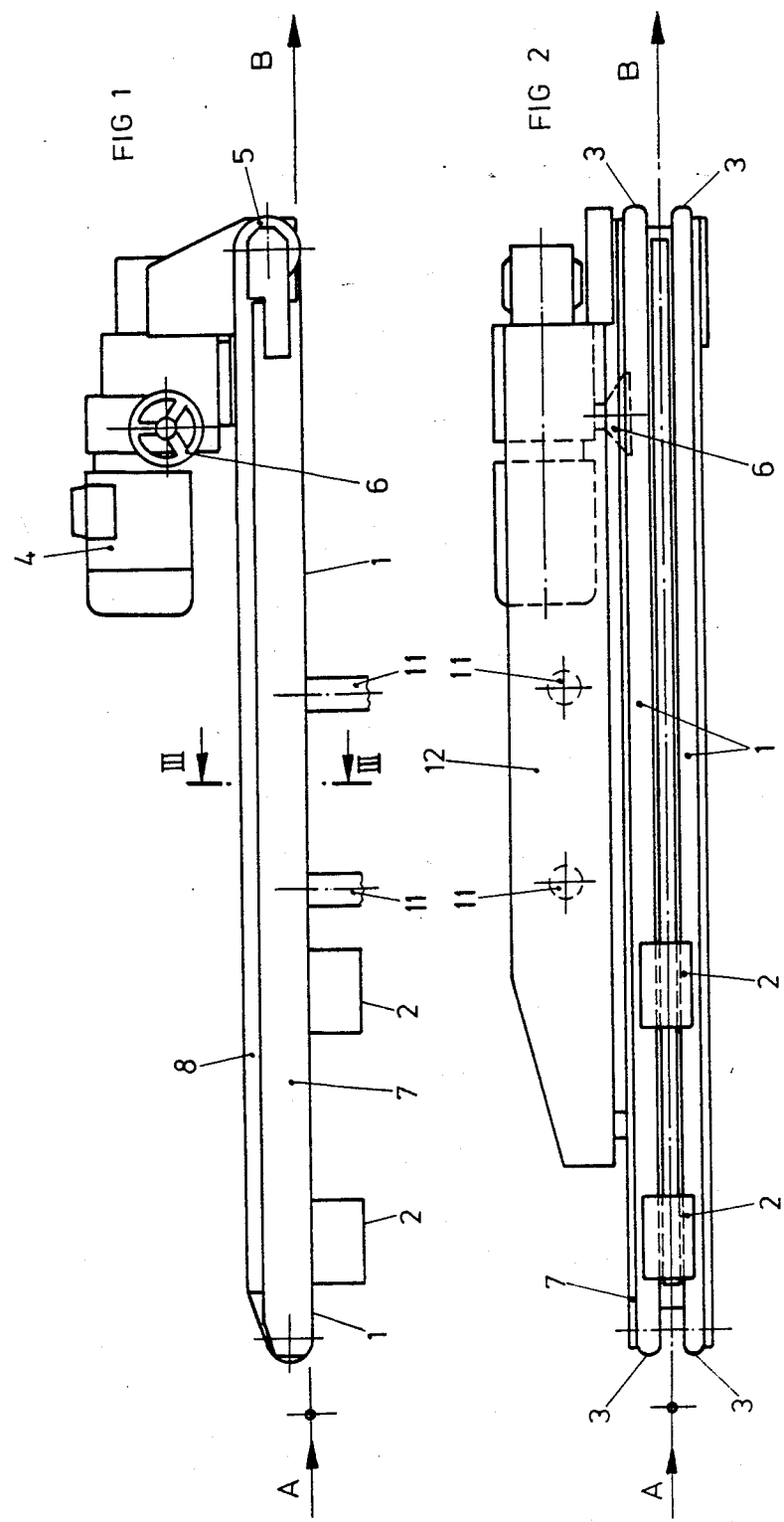

DEVICE FOR THE POSITIONALLY ACCURATE TRANSPORT OF CONTAINERS

The invention relates to a device for the positionally accurate transport of containers, and use of the device for a can seam coating installation.

When moving containers on transport devices, such as transport or conveyor belts, these containers can be shifted to a greater or lesser extent in their relative position with respect to the conveying direction on account of the inertial forces.

In special circumstances, as is the case, for example, in coating installations for the coating of can seams, positionally accurate conveyance of the cans is of central importance. Especially in continuous systems, the cans, after passing through the seam welding unit, are transferred with a specific positioning of the seam to the conveying system of the seam coating installation. Within this system, the cans must be transported through the coating zone up to a subsequent heat treatment zone in exactly the predetermined position so that coating of the seam, as well as subsequent curing of the coating by means of the positionally fixed coating nozzle and, respectively, the stationary heat radiator are ensured.

In conventional transport systems, the problem frequently arises, particularly in case of metallic containers, as cans, for example, that the containers cannot be introduced without vibrations, leading as early as at the beginning of the conveying step to positional changes of the containers. Another drawback resides partially in that these are in most cases designed for only one special container size. When changing the dimension of the container, such as, for example, the diameter of a can, an adjustment must correspondingly be effected in the transporting system.

Specifically in connection with can seam coating installations, endless hose belts or round belts are nowadays utilized to an increased extent; these also permit conveyance of containers having differing dimensions within a certain scope. Since these belts in most instances are produced from rubbery materials, vibration-free transport is likewise ensured. However, these round belts tend to twist and additionally there is the tendency toward slipping in the zone of the drive means. Also, welding together of such round belts and hose belts into an endless belt presents special problems Based on the aforedescribed array of problems, the positionally accurate conveyance during long-term operation is not ensured even when using these transportation systems.

Therefore, it is an object of the invention to provide a device making it possible to transport with positional accuracy containers of varying dimensions, such as, for example, cans having differing diameters, without incurring the above-discussed disadvantages.

This object has been attained according to this invention by a device in accordance with the wording of at least one of the claims, in particular claim 1.

The device disclosed according to the invention comprises an endless flat conveyor belt arrangement with two parallel convex load-bearing surfaces wherein the latter are preferably of constant convex curvature.

With preference, the radius of curvature of the two convex load-bearing surfaces is substantially larger than the thickness of the flat conveyor belt arrangement whereby the danger of twisting is eliminated and a large range of different-size and/or -shaped containers can be handled without readjustment manipulations.

In a preferred embodiment of the invention, the flat conveyor belt arrangement comprises two flat conveyor belts disposed in parallel to each other and traveling at the same speed, each having a convex load-bearing surface. The two flat conveyor belts are preferably located in one plane in this arrangement.

In order to increase the coefficient of friction between the convex load-bearing surfaces and the containers and thus to even better ensure positional accuracy, the convex load-bearing surfaces are contoured.

It is furthermore important that the drive for the device is controlled so that it is free of slippage. Thus, it is important in case of separate belts to drive the latter at identical speed For this purpose, the provision is made to contour or to perforate the surface of the conveyor belt arrangement facing away from the convex load-bearing surface in order to ensure optimum coupling by shape-mating engagement into a drive roller system.

In order to further broaden the range of container dimensions and/or shapes that can be handled, it is furthermore proposed when using two flat conveyor belts to arrange at least one of the conveyor belts to be laterally displaceable. In this case, the spacing between the conveyor belts, if additionally necessary, can be enlarged or reduced, for example, in dependence on the diameter of a can to be transported.

The same posed problem can also be solved, when using two conveyor belts, by mounting at least one conveyor belt to be swivelable about an axis extending in parallel to the conveying direction. Depending on the size of the container, the conveyor belts can then be swiveled toward each other or away from each other.

It is furthermore frequently of importance that conveyor belts do not get out of line laterally along the conveying direction, for example at half the distance between two rollers, since otherwise the container will change its position due to misalignment. This is prevented by mounting guide means, such as guide rails, for example, along the conveyor belts.

It is furthermore suggested to form the convex load-bearing surfaces by means of segments located in series along the conveyor belt arrangement; these segments are preferably pivotable transversely to the conveying direction. The convex supporting surfaces then optimally adapt themselves directly to any container automatically. Thereby, containers are retained to an optimum extent by their own weight and by the segments traveling along their surface.

"Slipping" of the containers must be precluded to a maximum degree, especially at high conveying speeds and conveying densities of the containers. For this reason, it is furthermore suggested to pull ferromagnetic containers onto the load-bearing surfaces by means of a magnet arrangement.

By utilizing such a magnet arrangement, the conveyor belt arrangement can also be disposed so that ferromagnetic containers are transported suspended at the conveyor belt.

Modifications of this embodiment consist in designing the supporting surface proper to be magnetic, or installing magnets in the zone of the conveying surfaces.

If relatively strong magnets, such as electromagnets, for example, are produced, or if magnetizing of the load-bearing surface is impossible, another embodiment suggests to provide stationary magnets on the side of the conveyor belt system facing away from the load-bearing surfaces, or between the load-bearing surfaces In order to prevent sagging of the conveyor belt arrangement when transporting ferromagnetic containers in suspension, it is proposed to install at or within the conveyor belt arrangement a ferromagnetic system, such as, e.g., wires or strings. Thereby the conveyor belt arrangement is pulled onto a support, such as, for example, a guide rail by means of magnets disposed on the side facing away from the load-bearing surfaces.

In case two conveyor belts are provided, it is suggested to locate magnets at each of the two zones of the conveyor belts facing away from the load-bearing surfaces, wherein two magnets facing each other transversely to the conveying direction are preferably of reverse polarity It was found that with identical poling and thus formation of two independent magnetic circuits, there is the tendency, especially in case of cans, for the cans to be subject to tilting motions, supposedly due to differing forces on either side of the cans, whereas in case of nonidentical polarity this tilting movement does not take place, for in such a case there results a single magnetic circuit per pair of magnets, connected by way of the can.

In order to provide a maximally effective, low-loss magnetic circuit, it is furthermore suggested to connect the poles of the magnets facing away from the conveyor belt surfaces to form a U-magnet arrangement. The leg poles of this U-shaped magnet each lie in the zone of the load-bearing surfaces, on the sides facing away from the latter.

Preferably, the magnets utilized are permanent magnets.

The above-described device for the positionally accurate transport of containers, as well as the various embodiments are especially suited for conveying cans in a can seam coating plant. The aforementioned device can also be used in conjunction with can welding, shaping, and other container processing installations.

Figure 4A:
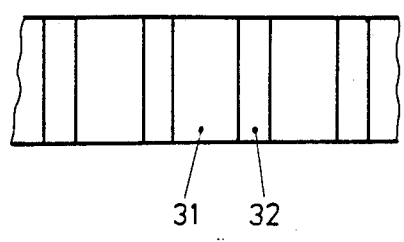
Figure 4:
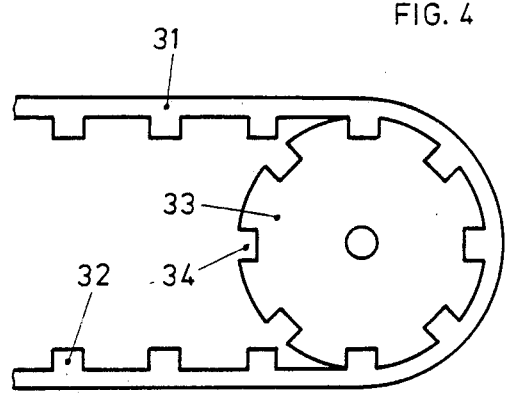
Figure 5A:
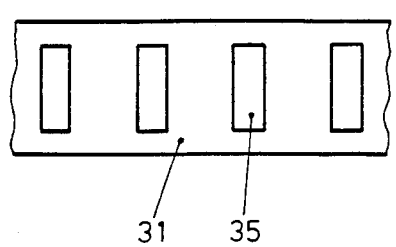
Figure 5:
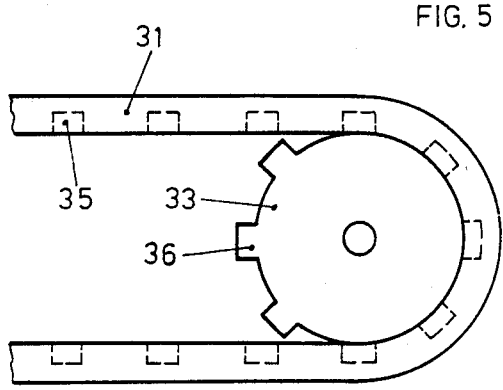
Figure 6:
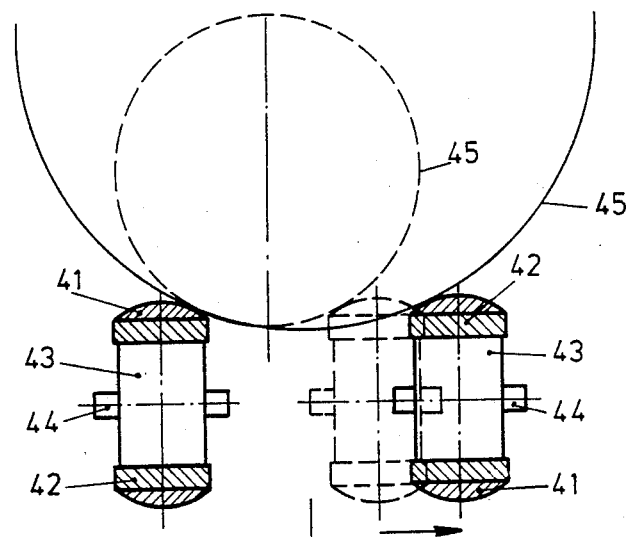
Figure 7:
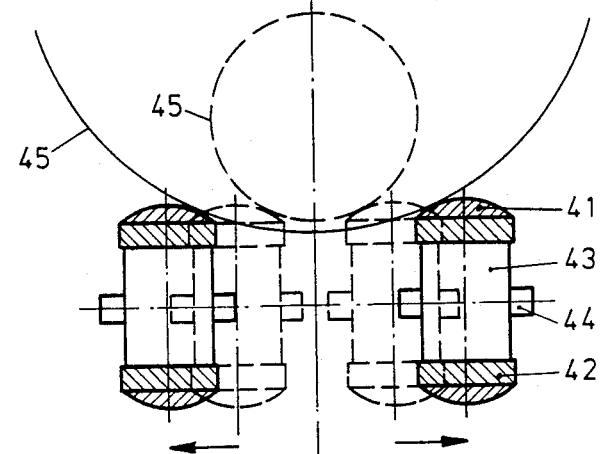
Figure 8:
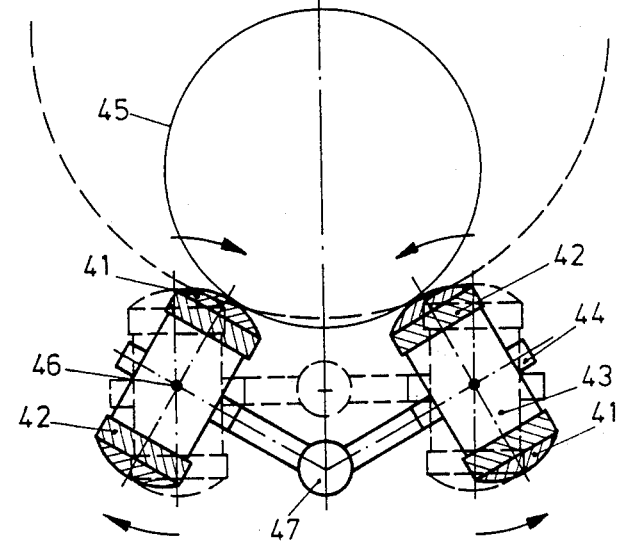
Figure 9:
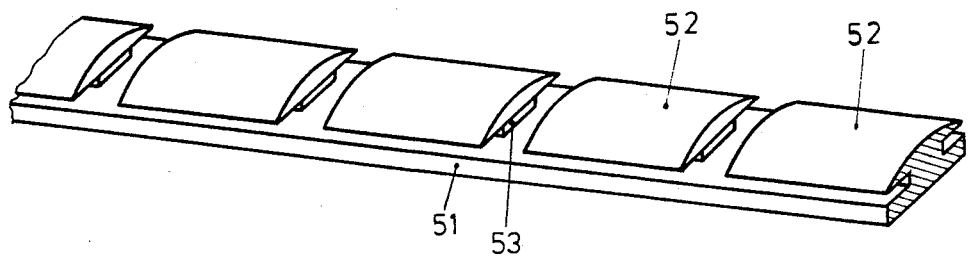
Figure 10:
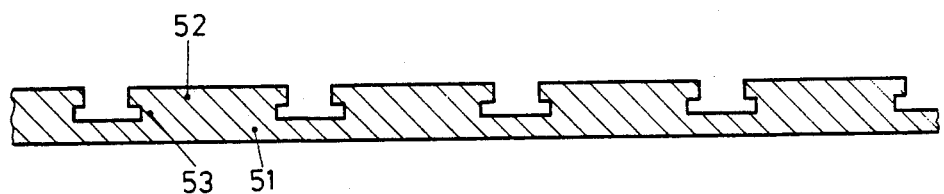
Figure 11:
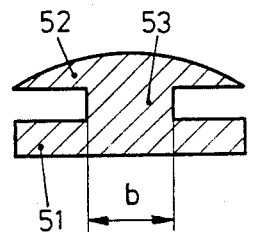
Figure 12:
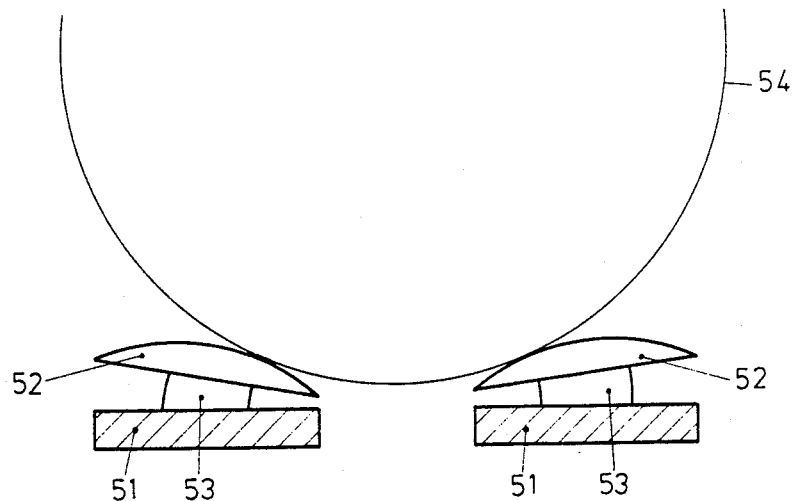
Figure 13:
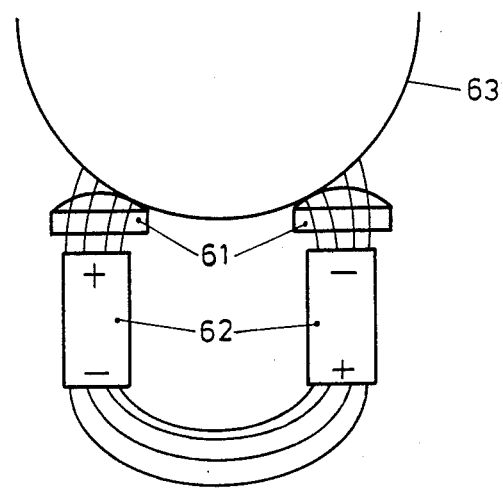
Figure 14:
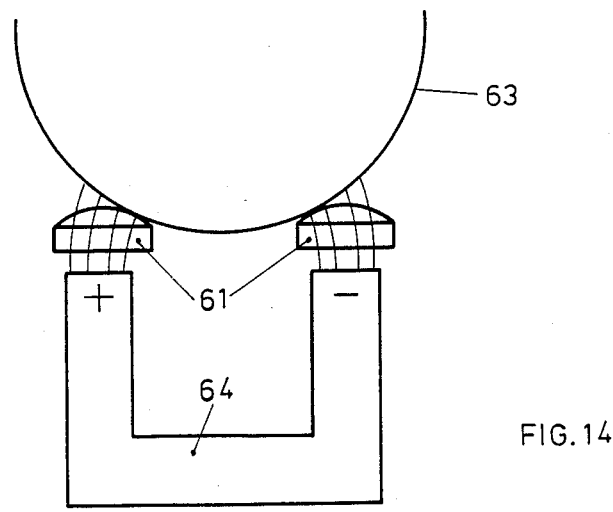
Figure 15:
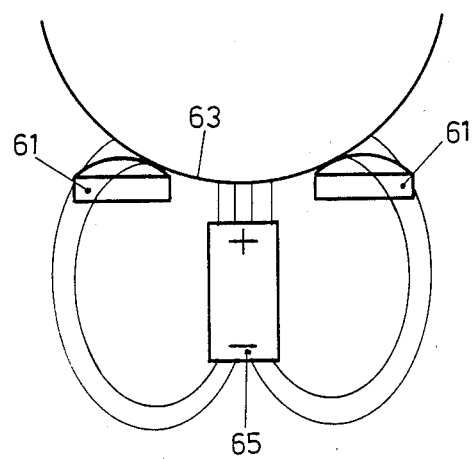

The device according to this invention will be described hereinbelow with reference to preferred examples of a flat conveyor belt arrangement for the transport of cans, consisting of two juxtaposed conveyor belts. In the first embodiment, the conveyor belt arrangement is chosen so that metal cans, attracted by magnets, are transported while suspended at the conveyor belts. The embodiments will be described while referring to figures wherein:

FIG. 1 shows schematically a flat conveyor belt arrangement according to this invention for transporting cans, in a lateral view, FIG. 2 shows the conveyor belt arrangement according to FIG. 1 seen from beneath, FIG. 3 shows a cross section of the arrangement according to FIG. 1 along section line III—III, FIG. 4 and FIG. 4a show schematically a drive system for a conveyor belt according to FIG. 1, FIG. 5 and FIG. 5a show a further version of a drive mechanism according to FIGS. 4, 4a, FIG. 6 shows two juxtaposed conveyor belts in cross section, one conveyor belt being arranged to be laterally displaceable, FIG. 7 shows the two juxtaposed conveyor belts in cross section, both conveyor belts being arranged to be laterally displaceable, FIG. 8 shows the two juxtaposed conveyor belts in cross section, the two conveyor belts being mounted to be swivelable about an axis extending in parallel to the transporting direction, FIG. 9 shows a conveyor belt in a perspective view, the load-bearing surface thereof being segmented, FIG. 10 shows the conveyor belt of FIG. 9 in a longitudinal section, FIG. 11 shows a single segment of the conveyor belt of FIG. 9, FIG. 12 shows two juxtaposed, segmented conveyor belts in a cross section in the deflected position, and FIGS. 13-15 show the arrangement of magnets relatively to two juxtaposed conveyor belts.

According to FIGS. 1 and 2, a flat conveyor belt arrangement comprises two conveyor belts 1 for the transporting of cans 2. The flat conveyor belts 1 are arranged so that the cans 2, attracted by magnets, are transported while suspended therefrom. The arrangement of the magnets will be described further below. FIG. 1 illustrates a lateral view, and FIG. 2 shows a view as seen from the bottom.

The two flat conveyor belts 1 with respectively convex load-bearing surfaces 3 are driven by a drive motor 4 by way of drive rollers 5. The drive motor 4 can be infinitely adjusted in its speed by means of a gear unit 6.

The conveyor belts 1 are protected by lateral casings 7 against lateral deflections and are further protected by a cover 8. By way of supports 11 and a mounting plate 12 (not shown in FIG. 1), the entire conveyor belt arrangement, including the drive mechanism, is fixed in an accurate position.

The cans 2 pass, for example, from a can seam welding machine in a zone A to the conveyor belts 1 illustrated in FIGS. 1 and 2 and are pulled by means of magnets (not visible) against the belts 1. On account of the convexly shaped load-bearing surfaces 3 of the belts 1, the cans 2 are stably held in the entering position until being transferred to a zone B following the conveyor belt arrangement, such as, for example, a heat treatment unit. The speeds of a preceding conveyor belt arrangement and of the arrangement according to this invention are preferably in synchronism so that the cans can be received from a preceding zone A with accurate positioning.

During transporting of the cans 2 by means of the conveyor arrangement, it is important that the two juxtaposed conveyor belts 1 travel at identical speed so that the positional accuracy is maintained. At the end of the illustrated flat conveyor belt arrangement, the can 2 is transferred to a subsequent zone B. If, in this zone B, the transport is to be continued with positional accuracy, then here, too, the speeds of the two conveying systems meeting at this point are preferably synchronized.

FIG. 3 shows a cross section through the flat conveyor belt arrangement according to section line III——III of FIG. 1.

A metal can 2 is disposed on the conveyor belts 1, resting on the convex load-bearing surfaces 3 thereof. It can be seen that it is possible, for example, to position and transport cans 2 having extremely varying diameters 2a (e.g. 45 mm) and 2b (e.g. 330 mm). The radius 20 of the convex load-bearing surfaces 3 is substantially larger than the thickness d of the conveyor belts 1, inter alia also so that the conveyor belts 1 run definitely quietly.

The metal can 2 is attracted to the conveyor belts 1 by magnets 21 and 22 and retained at the belts. So that a tilting movement of the can 2, as illustrated by α, will not take place on the conveyor belt, the magnets 21 and 22 are arranged with opposed polarity.

A casing 23 of nonmagnetizable material, such as of antimagnetic sheet metal, is located between the magnets 21 and 22 and the conveyor belts 1.

On the pole sides of magnets 21 and 22 lying in opposition to the conveyor belts 1, the two magnets are ferromagnetically connected with each other as legs through a conveyor belt housing 24 to which the two magnets 21 and 22 are fastened by way of screws; thus, a U-magnet arrangement 21, 22, 24 is created. Laterally of the magnets 21 and 22 and of the conveyor belts 1, the two lateral casings 7 of a material that is not ferromagnetic are provided at the housing 24. Guide rails 25 are mounted to the two casings 7, preventing lateral deflection of the conveyor belts 1.

The cover hood 8 is mounted at the upper part of housing 24 and covers and protects the two returning conveyor belt legs 1.

To prevent the two conveyor belts 1 from sagging on account of their own weight and the weight of the cans, in the illustrated embodiment of conveying the cans in suspended mode, longitudinally extending ferromagnetic strings 26 are incorporated into the conveyor belt. Due to these ferromagnetic strings 26, the two conveyor belts 1 are then pulled by the magnets 21 and 22 onto the not ferromagnetic casing 23 as the support.

Analogous conveyor belt arrangements intended for transporting containers resting thereon with positional accuracy are not forcibly dependent on the use of magnets. Correspondingly, in this case, it is also possible to transport positionally accurately containers that are not ferromagnetic.

Depending on the external configuration of the container, it may be indicated to provide that the convex load-bearing surfaces, in order to increase the coefficient of friction between the container and the load-bearing surface, are additionally profiled or coated with a non-slip material.

FIGS. 4, 4a, 5 and 5a show devices according to this invention for the shape-mating drive of a conveyor belt as illustrated, for example, in FIGS. 1-3.

In FIG. 4, nubs 32 are arranged on the drive side lying in opposition to the load-bearing surface transversely on a conveyor belt 31, shown in a longitudinal section and in the zone of the drive mechanism. The nubs 32 engage, at a drive gear or a drive shaft 33, into correspondingly provided grooves 34. Thus, slippage of the conveyor belt 31 while the wheel 33 is rotating is impossible.

FIG. 4a shows a fragment of the conveyor belt 31 seen directed toward the drive side, wherein the longitudinal expansion of the nubs 32 transversely to the conveyor belt 31 can be seen. However, the nubs can also be made to be shorter, or they can be arranged centrally or laterally.

Analogously, FIG. 5 shows profiling with recesses 35 on the drive side of the conveyor belt 31, again shown in longitudinal section and in the zone of the drive mechanism. Corresponding serrations 36 at the gear 33 engage into the recesses 35. A nonslip, shape-mating drive operation is again ensured.

FIGS. 6-8 illustrate how two juxtaposed conveyor belts are shifted, respectively swiveled, relative to each other.

FIG. 6 shows a conveyor belt 41 which is rigidly supported like a belt 1 according to FIG. 1-3, whereas the second conveyor belt 41 is supported to be laterally displaceable. The corresponding drive mechanisms, consisting of drive roller or drive shaft 43 with drive axle 44 as well as the shape-mating engaging means 42, are fashioned analogously to be rigid in one conveyor belt 41 and to be laterally displaceable in the other. One position of the displaceable parts is illustrated in dashed lines and the other in solid lines. Depending on the relative position of the two conveyor belts 41, containers 45 of differing sizes can be transported.

In FIG. 7, both conveyor belts 41 with the corresponding drive means, consisting of roller 43 with axle 44 and shape-mating engaging means 42, are supported to be laterally displaceable. Again, one position is shown in dashed lines and the other in solid lines. Here, too, containers 45 having greatly varying diameters can be transported.

In FIG. 8, the two conveyor belts 41 are mounted to be swivelable about an axis 46 extending in parallel to the conveying direction. The drive means pertaining thereto are likewise swiveled along; the two drive axles 44 can be connected, for example, by way of a suitable non-rotational compensating clutch 47 so that the drive operation can always take place from a single drive motor via a shaft, no matter whether in the horizontal or swiveled position. The horizontal initial position of the conveyor belts 41 is shown in dashed lines, and the swiveled position in solid lines.

FIGS. 9 through 12 show a conveyor belt, designed, for example, according to FIGS. 1-8, the load-bearing surface of which is constituted by sequential segments.

In FIG. 9, a conveyor belt 51 is shown in perspective, with individual series-connected segments 52. The segments 52 are fashioned to be convex on their surface in order to form the load-bearing surfaces for transporting the containers. The segments 52 are supported on the conveyor belt 51 by way of a shank 53.

In FIG. 10, the same conveyor belt 51 is shown in longitudinal section; again, the segments 52, arranged in series, are joined to the conveyor belt 51 in each case via the shank 53.

FIG. 11 shows a single segment 52 in cross section, as joined via the shank 53 to the conveyor belt 51. In order to make the segments 52 laterally pivotable relatively to the conveyor belt 51, rotation or deformation of the shank 53 is necessary. If, as in the illustrated example, the three parts—conveyor belt 51, segment 52, and shank 53—are made of one and the same material, then preferably a rubbery, deformable material is to be employed. Depending on the diameter b and the elasticity of the chosen material, the segment 52 is mounted on the conveyor belt 51 so that the segment can be laterally deflected, respectively deformed, to a lesser or greater extent. In case stiff materials are used, the shank 53 is located in a bearing of the conveyor belt, the shank 53 and thus the segment 52 being mounted on the conveyor belt to be pivotable about the axis of this bearing.

FIG. 12 shows, in cross section, two segmented conveyor belts lying in parallel beside each other.

The shank 53 is deformed by the inherent weight of the can 54 resting on the two segments 52 and/or if applicable by magnetic forces, leading to a swiveling movement of the segments 52. This ensures that the load-bearing surface at the segments 52 can always adapt itself optimally to the dimensions of containers, quite independently of the sequence with which different containers follow one another.

In FIGS. 13-15, two juxtaposed conveyor belts according to this invention are illustrated with different arrangements of magnets in a cross-sectional view transversely to the conveying direction.

In FIG. 13, a magnet 62 is arranged on each drive side of the two juxtaposed conveyor belts 61 facing away from the convex load-bearing surface. The two magnets 62 are arranged so that the poles lying at the drive side of the two conveyor belts 61 are mutually opposed. In this way, a single magnetic field is produced extending through a ferromagnetic container 63 and pulling the latter onto the load-bearing surfaces of the conveyor belts 61.

As shown in FIG. 14, these magnets are preferably constituted by a U-magnet 64.

In FIG. 15, a single magnet 65 is arranged lying between the two conveyor belts 61 of this invention.

The embodiments illustrated in FIGS. 1-15 have been described with preference for the transport of round containers, such as cans, for example. Similar embodiments of the device according to this invention are also suited for transporting with positional accuracy any desired containers. This also holds true, in particular, when using magnet arrangements wherein any desired ferromagnetic containers can be conveyed with positional accuracy.

I claim:

1. Device for the positionally accurate transport of containers, characterized in that the device comprises an endless flat conveyor belt arrangement including two endless parallel belts having respective parallel convex load-bearing surfaces for taking into account differing cross-sectional contours of the containers, said convex load-bearing surfaces being steadily arched, crosswise to the transport direction of the conveyor arrangement, and wherein the radius of curvature of each of the convex load-bearing surfaces is substantially larger than the thickness of the associated flat conveyor belt in the zone of the load-bearing surfaces, wherein the flat conveyor belt arrangement comprises two flat conveyor belts arranged in parallel to each other, lying preferably in one plane, including in each case a convex load-bearing surface, and traveling at identical speed, the flatness of said flat conveyor belts being such that each belt has a width in a direction crosswise to the transport direction of the conveyor arrangement which is substantially larger than the thickness thereof.

2. Device according to claim 1, characterized in that at least one surface of the flat conveyor belt arrangement facing away from the convex load-bearing surfaces engages in shape-mating fashion into at least one drive roller.

3. Device according to claim 1, characterized in that at least one flat conveyor belt is laterally displaceable transversely to the conveying direction.

4. Device according to claim 1, characterized in that guide means are arranged laterally with respect to the conveyor belts, these guide means preventing local lateral deflection of the conveyor belts transversely to the conveying direction.

5. Device according to claim 1, characterized in that the convex load-bearing surfaces are constituted by segments arranged in series along the flat conveyor belt arrangement.

6. Device according to claim 1, characterized in that a magnet means is provided for pulling ferromagnetic containers onto the load-bearing surfaces.

7. Device according to claim 6, characterized in that the magnet means comprises at least one stationary magnet on the side of the conveyor belt arrangement opposite the load-bearing surfaces.

8. Device according to claim 7, characterized in that the magnet means comprises magnets of different polarity located on the side of the conveyor belt arrangement opposite the conveying surfaces.

9. Device according to claim 7, characterized in that the magnet means includes at least one permanent magnet.

10. Device for the positionally accurate transport of containers, characterized in that the device comprises an endless flat conveyor belt arrangement including two endless parallel belts having respective parallel convex load-bearing surfaces for taking into account differing cross-sectional contours of the containers, said convex load-bearing surfaces being steadily arched, crosswise to the transport direction of the conveyor arrangement, and wherein the radius of curvature of each of the convex load-bearing surfaces is substantially larger than the thickness of the associated flat conveyor belt in the zone of the load-bearing surfaces, wherein the flat conveyor belt arrangement comprises two flat conveyor belts arranged in parallel to each other, lying preferably in one plane, including in each case one of the said convex load-bearing surfaces, and traveling at identical speed, the flatness of said flat conveyor belts being such that each belt has a width in a direction crosswise to the transport direction of the conveyor arrangement which is substantially larger than the thickness thereof, and characterized in that at least one conveyor belt is supported to be swivelable about an axis extending in parallel to the conveying direction.

11. Device for the positionally accurate transport of containers, characterized in that the device comprises an endless flat conveyor belt arrangement including two endless parallel belts having respective parallel convex load-bearing surfaces for taking into account differing cross-sectional contours of the containers, said convex load-bearing surfaces being steadily arched, crosswise to the transport direction of the conveyor arrangement, and wherein the radius of curvature of each of the convex load-bearing surfaces is substantially larger than the thickness of the associated flat conveyor belt in the zone of the load-bearing surfaces, characterized in that the convex load-bearing surfaces are constituted by segments arranged in a series along the flat conveyor belt arrangement, and characterized in that the segments are arranged at the conveyor belt arrangement to be swivelable transversely to the conveying direction at least within a specific angle range.

12. Device for the positionally accurate transport of containers, characterized in that the device comprises an endless flat conveyor belt arrangement including two endless parallel belts having respective parallel convex load-bearing surfaces for taking into account differing cross-sectional contours of the containers, said convex load-bearing surfaces being steadily arched, crosswise to the transport direction of the conveyor arrangement, and wherein the radius of curvature of each of the convex load-bearing surfaces is substantially larger than the thickness of the associated flat conveyor belt in the zone of the load-bearing surfaces, characterized in that a magnet means is provided for pulling ferromagnetic containers onto the load-bearing surfaces, and characterized in that the conveyor belts have incorporated therein ferromagnetic strings whereby the belts are also pulled by said magnet means.

13. Device for the positionally accurate transport of containers, characterized in that the device comprises an endless flat conveyor belt arrangement including two endless parallel belts having respective parallel convex load-bearing surfaces for taking into account differing cross-sectional contours of the containers, said convex load-bearing surfaces being steadily arched, crosswise to the transport direction of the conveyer arrangement, and wherein the radius of curvature of each of the convex load-bearing surfaces is substantially larger than the thickness of the associated flat conveyor belt in the zone of the load-bearing surfaces, characterized in that a magnet means is provided for pulling ferromagnetic containers onto the load-bearing surfaces, characterized in that the magnet means comprises at least one stationary magnet on the side of the conveyor belt arrangement opposite the load-bearing surfaces, and characterized in that ferromagnetic members are provided in the conveyor belts arrangement in order to pull same onto a support by means of the magnet means.

14. Device for the positionally accurate transport of containers, characterized in that the device comprises an endless flat conveyor belt arrangement including two endless parallel belts having respective parallel convex load-bearing surfaces for taking into account differing cross-sectional contours of the containers, said convex load-bearing surfaces being steadily arched, crosswise to the transport direction of the conveyor arrangement, and wherein the radius of curvature of each of the convex load-bearing surfaces is substantially larger than the thickness of the associated flat conveyor belt in the zone of the load-bearing surfaces, characterized in that a magnet means is provided for pulling ferromagnetic containers onto the load-bearing surfaces, characterized in that the magnet means comprises at least one stationary magnet on the side of the conveyor belt arrangement opposite the load-bearing surfaces, and characterized in that the magnet means comprises at least one magnet arrangement which is U-shaped in cross section, the leg poles thereof lying each at a zone of the conveyor belt arrangement facing opposite a load-bearing surface.

* * * * *